US012520959B2

(12) United States Patent
Ginberg

(10) Patent No.: US 12,520,959 B2
(45) Date of Patent: Jan. 13, 2026

(54) DUVET COVER AND FILLER BLANKET SYSTEM

(71) Applicant: DOZE INC., Boca Raton, FL (US)

(72) Inventor: Bryan Ginberg, Boca Raton, FL (US)

(73) Assignee: DOZE INC, Boca Raton, FL (US)

( * ) Notice: Subject to any disclaimer, the term of this patent is extended or adjusted under 35 U.S.C. 154(b) by 362 days.

(21) Appl. No.: 18/087,997

(22) Filed: Dec. 23, 2022

(65) Prior Publication Data

US 2023/0200572 A1 Jun. 29, 2023

Related U.S. Application Data

(60) Provisional application No. 63/293,605, filed on Dec. 23, 2021.

(51) Int. Cl.

| | |
|---|---|
| ***A47G 9/02*** | (2006.01) |
| ***B64U 10/13*** | (2023.01) |
| ***B64U 10/20*** | (2023.01) |
| ***B64U 20/70*** | (2023.01) |
| ***B64U 20/87*** | (2023.01) |

(52) U.S. Cl.
CPC ........... *A47G 9/0261* (2013.01); *B64U 10/13* (2023.01); *B64U 10/20* (2023.01); *B64U 20/70* (2023.01); *B64U 20/87* (2023.01)

(58) Field of Classification Search
CPC ....... A47G 9/0207; A47G 9/02; A47G 9/0261
See application file for complete search history.

(56) References Cited

U.S. PATENT DOCUMENTS

| | | | | |
|---|---|---|---|---|
| 1,347,642 A * | 7/1920 | Mcnatt | A47G 9/0261 5/501 |
| 4,040,133 A * | 8/1977 | Gilreath | A47G 9/0238 24/72.5 |
| 6,901,614 B2 | 6/2005 | Holub et al. | |
| 7,111,345 B1 * | 9/2006 | Hui | A47G 9/0207 5/501 |
| 7,228,578 B2 | 6/2007 | Linnane | |
| 9,549,625 B1 * | 1/2017 | Wilkinson | A47G 9/0223 |
| 10,285,517 B2 | 5/2019 | Heiman et al. | |
| 11,771,247 B1 * | 10/2023 | Gillquist | A47G 9/0261 5/652 |
| 2018/0168372 A1 | 6/2018 | Pool | |
| 2019/0059618 A1 * | 2/2019 | Jocic | A47G 9/04 |
| 2020/0060447 A1 * | 2/2020 | Fravel | A47G 9/0261 |

FOREIGN PATENT DOCUMENTS

| | | | | |
|---|---|---|---|---|
| CA | 2329701 A1 * | 6/2001 | A47C 27/124 |
| CA | 3002360 A1 * | 11/2018 | |
| CN | 201189038 Y * | 2/2009 | A47G 9/0261 |
| CN | 110025175 | 7/2019 | |
| GB | 2384702 A * | 8/2003 | A47G 9/02 |
| GB | 2522645 A * | 8/2015 | A47G 9/0207 |
| WO | 2021006447 | 1/2021 | |

OTHER PUBLICATIONS

International Search Report and Written Opinion for PCT/US22/53946, Authorized Officer Kari Rodriguez, Mailing Date Mar. 22, 2023, pp. 1-12.

* cited by examiner

*Primary Examiner* — Eric J Kurilla

(74) *Attorney, Agent, or Firm* — Concept Law Group, PA; Scott D. Smiley; Scott M. Garrett

(57) ABSTRACT

A duvet cover and filler blanket system is disclosed in which the filler blanket fits within the duvet cover and is retained by connector elements that act to hold the filler blanket in place between the top and bottom panels.

10 Claims, 10 Drawing Sheets

DUVET COVER AND FILLER BLANKET SYSTEM

CROSS-REFERENCE TO RELATED APPLICATION

This application claims priority to U.S. Provisional Patent Application No. 63/293,605 filed Dec. 23, 2021, the entirety of which is incorporated by reference.

FIELD OF THE INVENTION

The present invention relates generally to bedding materials such as duvets and blankets, and, more particularly, relates to a duvet and blanket system in which the blanket is retained with the duvet.

BACKGROUND OF THE INVENTION

Duvet covers are well-known in the bedding industry and typically include an upper panel and a lower panel that are attached along the opposite sides and the top end. The bottom end is usually able to open, by button fasteners, zippers or other closure means. A filler blanket, which is typically similar to a comforter, is able to be received through the bottom opening of the duvet cover so that it is positioned between the upper and lower panels of the cover. One problem associated with most duvet covers is that the single bottom opening makes it difficult to insert the filler blanket and to properly and evenly distribute the filler blanket throughout the entire interior of the duvet cover. A further problem associated with all duvet covers presently known in the field of bedding is the undesirable movement or migration of the filler blanket within the duvet cover, causing the filler blanket to bunch up in certain areas while leaving voids in other areas of the cover. This happens rather quickly in the process of making the bed and moving the duvet cover while sleeping. The undesirable movement of the filler blanket within the duvet cover can be quite annoying, particularly when certain areas of the duvet cover are empty and other areas of the duvet cover are left with a bunched up portion of the filler blanket that is clearly visible and unsightly when the bed is made. Moreover, it is extremely difficult to adjust the filler blanket back into the proper position, as most duvet covers only provide for the access opening at the bottom end.

Therefore, a need exists to overcome the problems with the prior art as discussed above.

SUMMARY OF THE INVENTION

In accordance with some embodiments of the inventive disclosure, there is provided a bedding system that includes a duvet cover having a top panel and a bottom panel that are substantially the same size and shape, and which define four corners. The top panel and the bottom panel each have a first end edge and a second end edge opposite the first end edge, and a first side edge and a second side edge opposite the first side edge. The first end edge, first side edge, and second side edge of the top panel and first end edge, first side edge, and second side edge of the bottom panel are, respectively, configured to be alternatively and selectively joined together and separated from each other. The bedding system also includes a first connector disposed in a first corner of the duvet cover where the first end edge and first side edge meet, a second connector disposed in a second corner of the duvet cover where the first end edge and second side edge meet, a third connector disposed in a third corner of the duvet cover where the second end edge and first side edge meet, and a fourth connector disposed in a fourth corner of the duvet cover where the second end edge and second side edge meet. Each of the first, second, third, and fourth connectors include a connector element disposed in the top panel and a corresponding mating connector element disposed in the bottom panel. The bedding system also includes a filler blanket that is sized to fit between the top panel and the bottom panel of the duvet cover. The filler blanket having a first corner, a second corner, a third corner, and fourth corner. The first connector, second connector, third connector, and fourth connector are each respectively configured to hold the first corner, second corner, third corner, and fourth corner of the filler blanket at the first corner, second corner, third corner, and fourth corner, respectively, of the duvet cover.

In accordance with a further feature, at each of the first, second, third, and fourth corners of the filler blanket comprise an opening through which the first, second, third, and fourth connectors connect.

In accordance with a further feature, the first, second, third, and fourth connectors are snap button connectors.

In accordance with a further feature, the first, second, third, and fourth connectors are hook and loop connectors.

In accordance with a further feature, the first, second, third, and fourth connectors are bar and loop connectors.

In accordance with a further feature, the first, second, third, and fourth connectors comprise a strap portion attached to the top panel and a strap portion attached to the bottom panel, and wherein each of the strap portions comprise a snap button connector element.

In accordance with a further feature, the filler blanket includes, at each of the first, second, third, and corners, a connector element that connects to the corresponding connector elements in the top and bottom panels.

In accordance with some embodiments of the inventive disclosure, there is provided a duvet cover and filler blanket system that includes a duvet cover having a top panel and a bottom panel, a filler blanket configured to fit between the top panel and the bottom panel, and a plurality of connectors that retain the filler blanket in place between the top and bottom panels.

In accordance with a further feature, the plurality of connectors are disposed at corners of the duvet cover and filler blanket.

In accordance with a further feature, the plurality of connectors each comprise a connector element at the top panel that mates with a corresponding connector element at the bottom panel through a corresponding opening in the filler blanket.

In accordance with a further feature, the plurality of connectors each comprise interlocking snap connector elements.

In accordance with a further feature, the plurality of connectors each comprise bar and loop connectors.

In accordance with a further feature, the plurality of connectors each comprise hook and loop connectors.

In accordance with a further feature, the plurality of connectors each comprise a connector element at the filler blanket that mates with a corresponding connector element at the bottom panel through a corresponding opening in the filler blanket.

In accordance with a further feature, the plurality of connectors each comprise interlocking snap connector elements.

In accordance with a further feature, the plurality of connectors each comprise bar and loop connectors.

In accordance with a further feature, the plurality of connectors each comprise hook and loop connectors.

In accordance with a further feature, the top panel lacks connector elements.

In accordance with a further feature, the plurality of connectors each further comprise a connector element at the top panel.

In accordance with a further feature, the top panel and the bottom panel further define edges, and wherein the top pane and bottom panel are configured to be alternatively and selectively joined together and separated from each other.

Although the invention is illustrated and described herein as embodied in a duvet cover and filler blanket system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the article being referenced Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
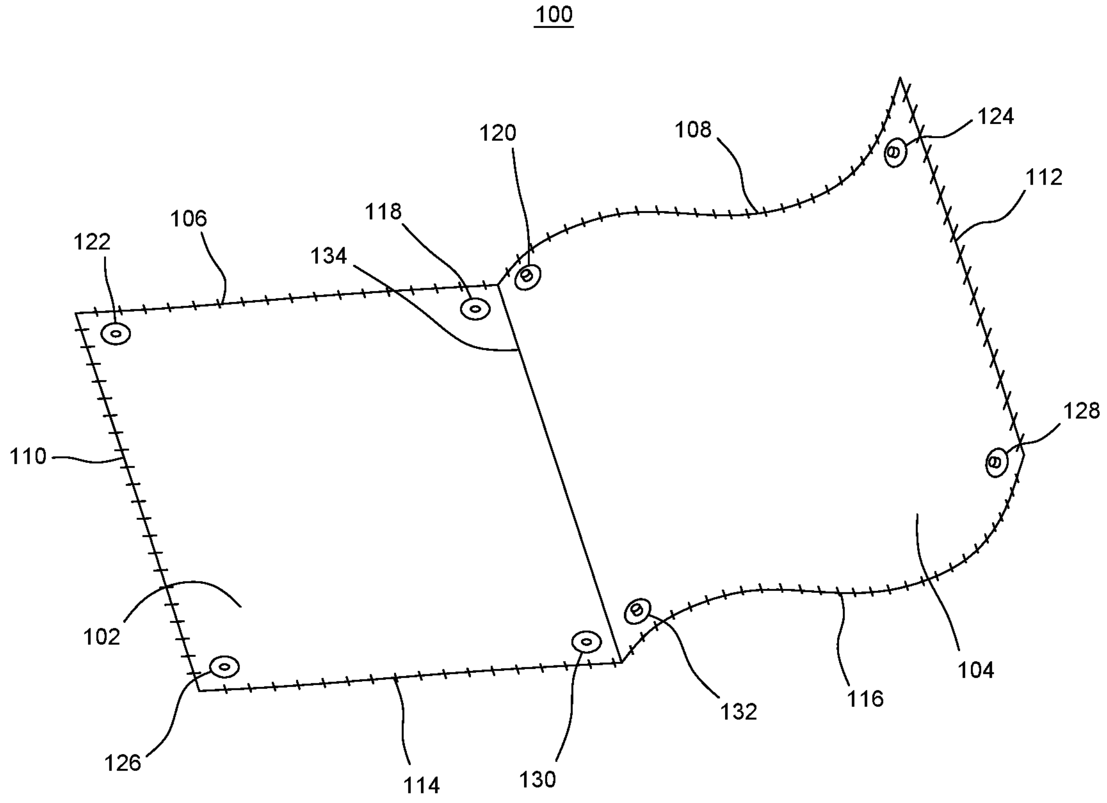
FIG. 1 is a perspective view of a duvet cover in an open configuration, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

There remains a need in the bedding industry for a duvet cover and filler blanket system that allows for easy placement and removal of the filler blanket within the duvet cover, and further wherein the system allows for easily and conveniently securing the filler blanket in the desired optimal position between the upper and lower panels of the duvet cover (i.e., evenly and fully distributed through the cover interior) so that the filler blanket is unable to move relative to the upper and lower panels of the duvet cover during use of the duvet cover.

FIG. 1 is a perspective view of a duvet cover 100 in an open configuration, in accordance with some embodiments. The duvet cover 100 is a fabric article having a bottom portion or panel 102 and a matching top portion or panel 104. Each of the panels 102, 104 are generally rectangular, and they can be integrally joined at a first end edge 134. A first side edge 106 of the bottom panel 102 corresponds and joins with a first side edge 108 of the top panel 104. Likewise, a second side edge 114 of the bottom panel 102 corresponds and joins with a second side edge 116 of the top panel 104. The second end edge 110 of the bottom panel 102 corresponds and joins with a second end edge 112 of the top panel 104. That is, the edge pairs 106/108, 110/112, and 114, 116 can be joined by, for example, zipper elements that run along each of the edges. This allows the duvet cover 100 to be selectively opened or closed. In particular, the duvet cover 100 can be opened as shown in order to place a filler blanket into the duvet cover 100, after which the duvet cover 100 can be closed by closing the zippers along the first and second side edges and the second end edge. At each corner of the top and bottom panels 102, 104, there are corresponding mating connector elements. That is, connector element 118 connects with connector element 120, element 122 with element 124, element 126 with element 128, and element 130 with element 132. As will be shown, there are a variety of connector elements that can be used, including, for example, button snaps, hook and loop connectors, bar and loop connectors, and so on.

Figure 2:
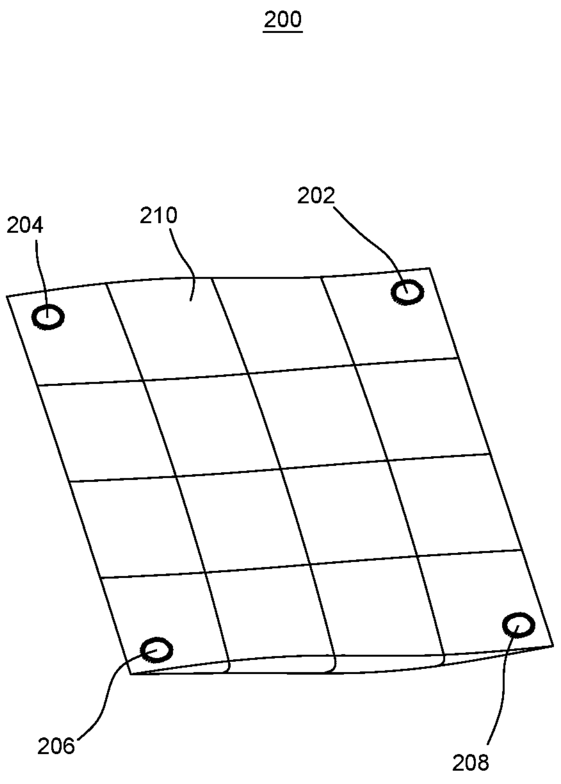
FIG. 2 is a perspective of a filler blanket for use in a duvet cover and filler blanket system, in accordance with some embodiments.

FIG. 2 is a perspective of a filler blanket 200 for use in a duvet cover and filler blanket system, in accordance with some embodiments. The filler blanket 200 has a body 210 that can be a fabric or other textile panel element that is shaped to correspond with the shapes of the duvet cover panels 102, 104, but having slightly smaller dimensions (length, width). The body 210 can have four corners that each correspond to a particular one of the corners of the duvet cover 100. In the present embodiment, there is an opening 202, 204, 206, 208 at each corner. To place the blanket into the duvet cover 100, the duvet cover 100 is opened, as shown in FIG. 1. The blanket 200 is then placed on the bottom panel 102 of the duvet cover such that opening 202 is aligned with connector element 118, opening 204 is aligned with connector element 122, opening 206 is aligned with connector element 126, and opening 208 is aligned with connector element 130. Then connector element 120 is connected to connector element 118 through opening 202, connector element 124 is connected to connector element 122 through opening 204, connector element 128 is connected to connector element 126 through opening 206, and connector element 132 is connected to connector element 130 through opening 208. By “connected to,” as used here, it is meant that the connector elements are retained together by, for example, mechanical interference that tends to hold them together until a person disconnects them. After the corresponding connector elements are connected together through the corresponding openings in the blanket 200, the zippers along the edges can then be closed, and the duvet cover with the filler blanket secured inside can then be used. By capturing the corners of the blanket 200 to the respective corners of the duvet cover 100, the blanket 200 will remain in place inside the duvet cover 100, and will not migrate to one side or bunch up inside the duvet cover 100. When a person wants to remove the blanket 200 from the duvet cover 100, such as for washing/laundering the blanket 200, the process is performed in reverse; the zippers on the edges are opened, the connecting elements are disconnected from each other, and the blanket 200 can then be removed from the duvet cover 100.

Figure 3A:
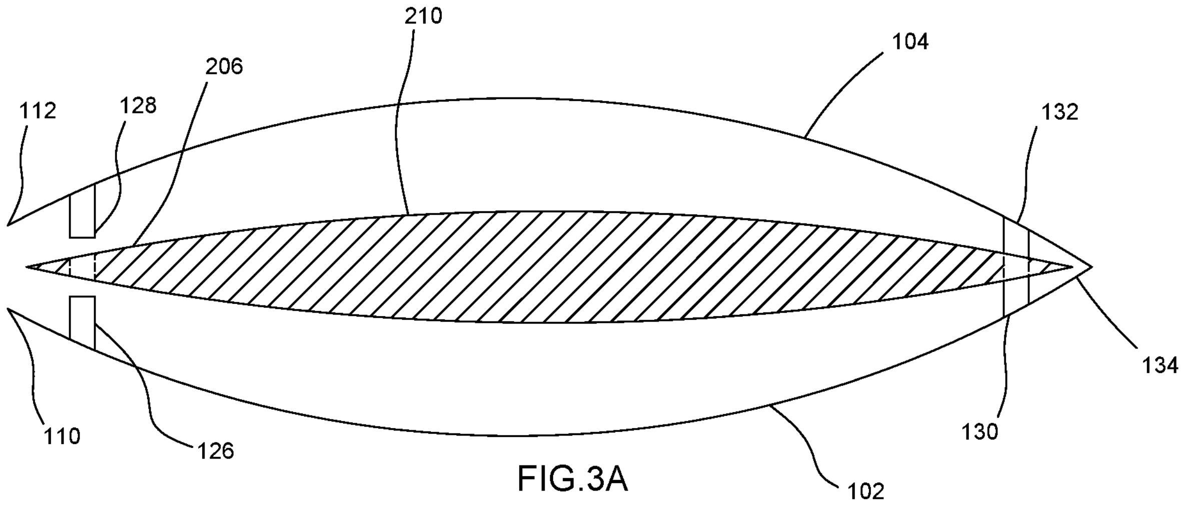
FIGS. 3A-3B show side cross sectional views taken centrally through the connectors along one edge of a duvet cover and filler blanket system, in accordance with some embodiments.
Figure 3B:
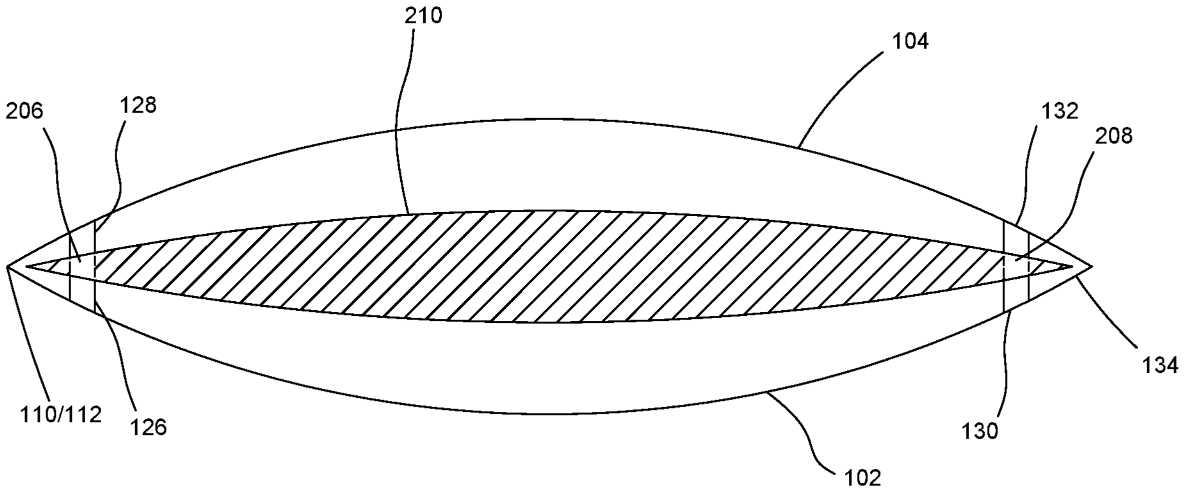
Figure 10:
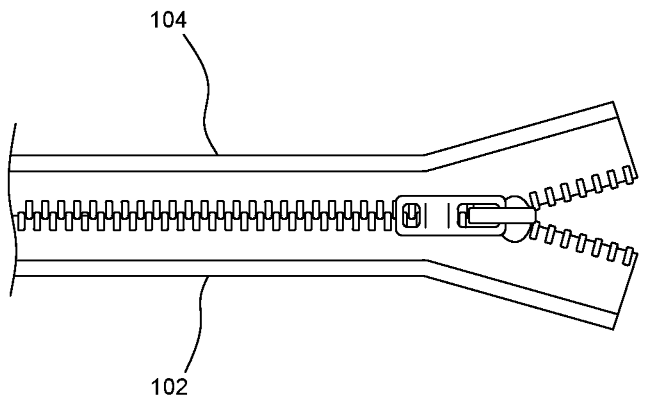
FIG. 10 shows an edge view of the duvet cover panels in which the panels are coupled to or decoupled from each other by a zipper.

FIGS. 3A-3B show side cross sectional views taken centrally through the connectors along one edge of a duvet cover and filler blanket system, in accordance with some embodiments. In FIG. 3A the connecting elements 130 and 132 are shown connected together through opening 208 the blanket body 210. Which means the connectors at the second end, such as connecting elements 126, 128 then need to be connected together through opening 206. The second end edges 110, 112 are open so that a person can reach in and connect elements 126 to element 128 through opening 206. FIG. 3B shows the elements 126, 128 connected together through opening 206, and the second end edges 110, 112 are zippered together to close the second end. Thus, in FIG. 3B the blanket is captured inside the closed duvet cover 100. FIG. 10 shows an edge view of the duvet cover panels in which the panels are coupled to or decoupled from each other by a zipper.

Figure 4A:
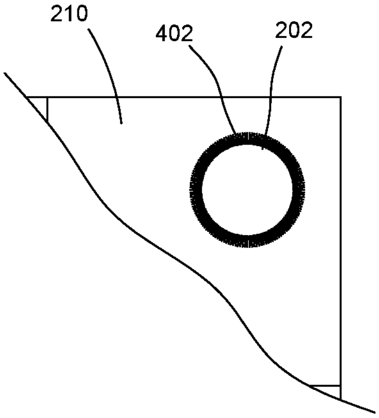
FIGS. 4A-4C show various examples of corners of filler blankets having features through which connectors can pass to capture the filler blanket inside the duvet cover, in accordance with some embodiments.
Figure 4B:
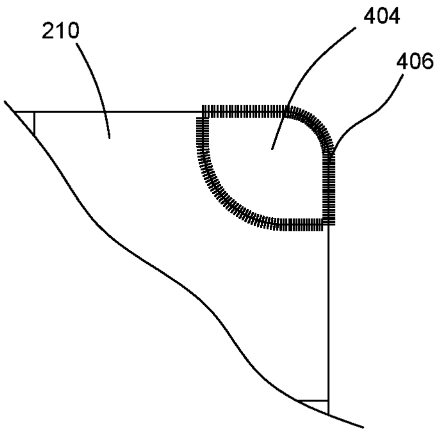
Figure 4C:
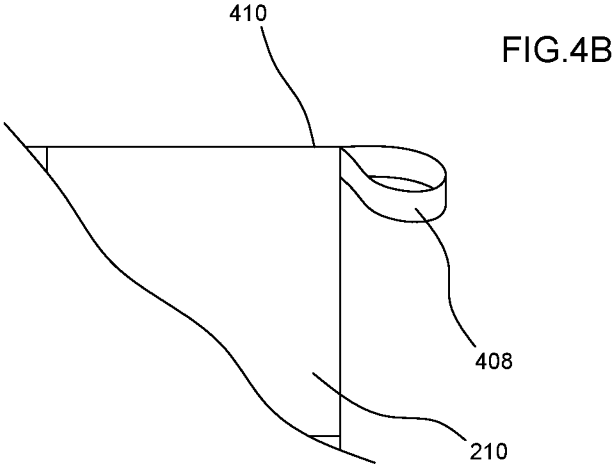

FIGS. 4A-4C show various examples of corners of filler blankets having features through which connectors can pass to capture the filler blanket inside the duvet cover, in accordance with some embodiments. In FIG. 4A the embodiment of FIG. 2 is shown where the blanket body 210 has an opening 202, for example. The opening can be defined by a plastic or metal grommet that clamps to the material around the opening through the blanket and defines an opening itself. Alternatively, as shown here, the opening 202 can be ringed with stitching 402 that prevents tearing of the material of the blanket around the opening 202. In FIG. 4A the opening 202 is near the corner of the blanket, but there is some material of the blanket between the opening 202 and the edges of the blanket body 210. In FIG. 4B, the opening 404 is formed at the corner, with the edges of the blanket body 210 being reinforced with stitching 406 around the opening 404. The material of the blanket body 210 can be gathered inside the stitching around a portion of the perimeter of the opening 404, forming a strand portion. The connector elements can pass through the opening 404, however, and thereby retain the blanket in position at the respective corner of the duvet cover. In FIG. 4C a loop 408 of material is provided at corner. The loop 408 can be stitched into the material of the blanket 210 along region 410, and the connector elements can be passed through the loop 408 (e.g. the opening defined by the loop 408) to retain the blanket.

Figure 5:
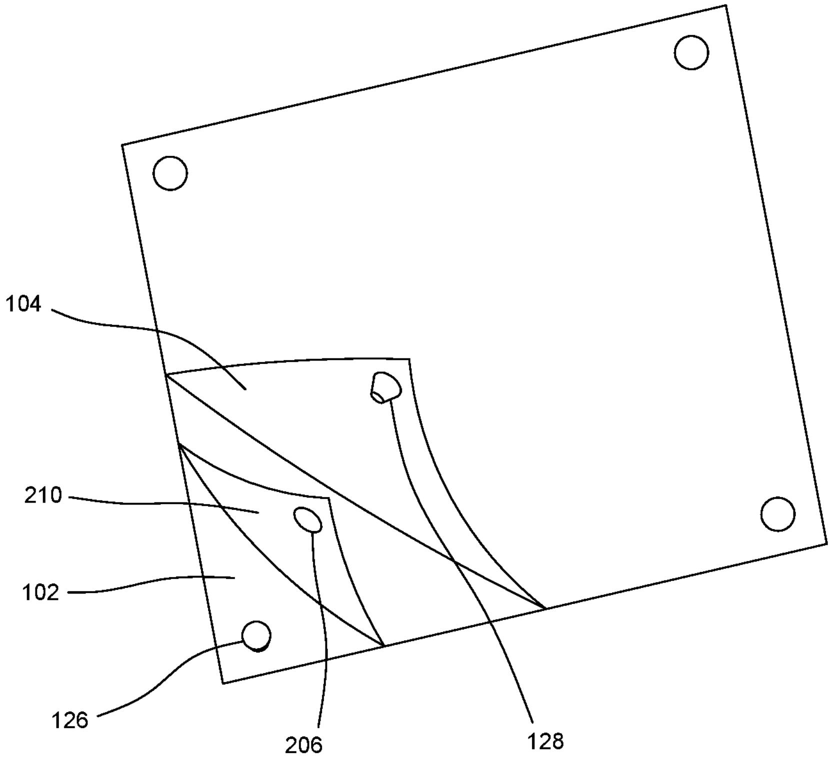
FIG. 5 top perspective view of a duvet cover and filler blanket system in which the top portion of the duvet cover and the filler blanket are peeled away from the bottom portion of the duvet cover at one corner to show the various layers, in accordance with some embodiments.

FIG. 5 top perspective view of a duvet cover and filler blanket system in which the top portion 104 of the duvet cover and the filler blanket body 210 are peeled away from the bottom portion 102 of the duvet cover at one corner to show the various layers, in accordance with some embodiments. Connector element 128 connects to connector element 126 through the opening 206 in the filler blanket body 210. As shown here, the corner at which the layers are shown separated is either the last to be closed, or the first to be opened. The edge zippers are operated accordingly, depending on whether the duvet cover is being opened or closed.

Figure 6:
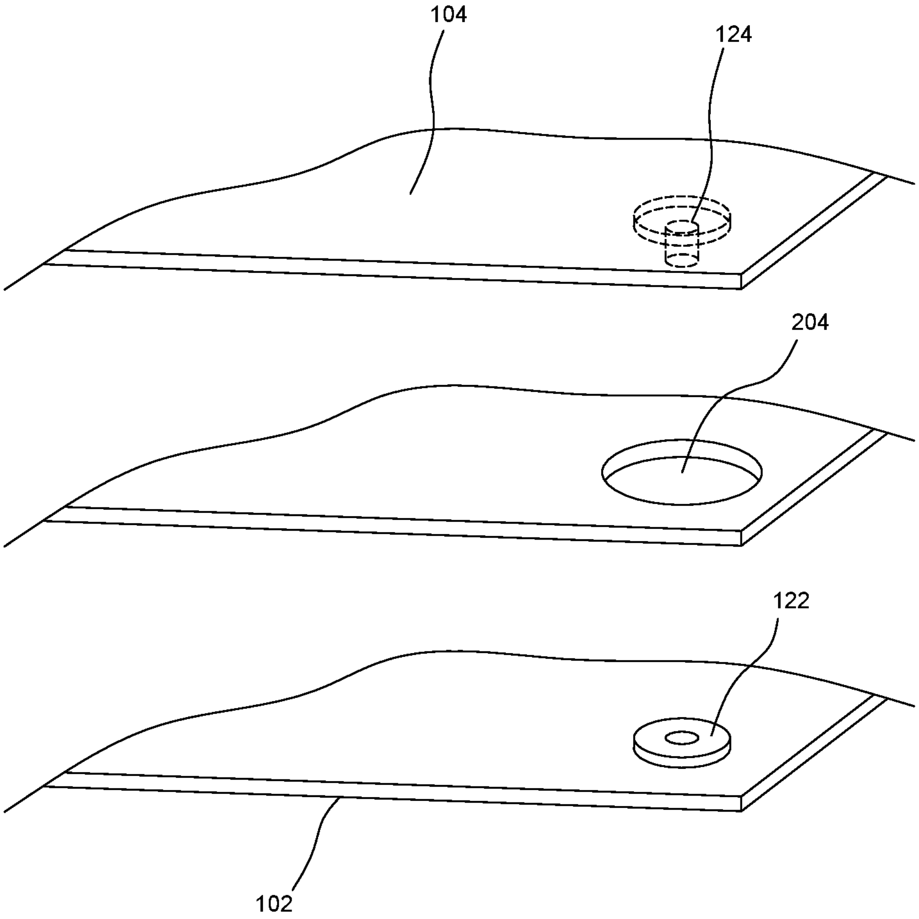
FIG. 6 shows an alternate perspective view of the layers at a corner of a duvet cover and filler blanket system, in accordance with some embodiments.

FIG. 6 shows an alternate perspective view of the layers at a corner of a duvet cover and filler blanket system, in accordance with some embodiments. Shown are the top panel 104 of the duvet cover, the filler blanket body 210, and the bottom panel 102 of the duvet cover. The filler blanket body 210 includes an opening 204 in a corner of the filler blanket body 210. The opening 204 is located to correspond with the location of a connector element 124 in the top panel 104, and a mating connector element 122 in the bottom panel 102 of the duvet cover. That is connector element 124 connects to connector element 122, such as by a snap fit. And these connector elements 122, 124 connect together through the opening 204. A similar arrangement is provided at each of the other corners of the duvet cover and filler blanket system, and can also be provided at positions along the edges, as well as at positions more centrally located, if necessary.

Figure 7A:
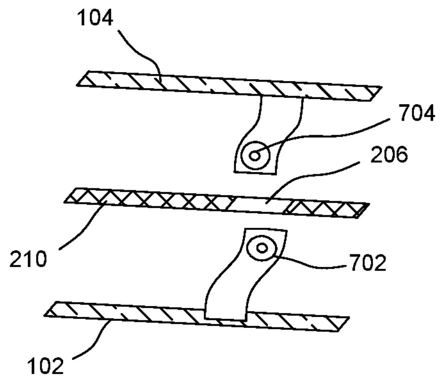
FIGS. 7A-7C show cross sectional view of the layers of a duvet cover and filler blanket system in which various connectors are used to how the layers together, in accordance with some embodiments.
Figure 7B:
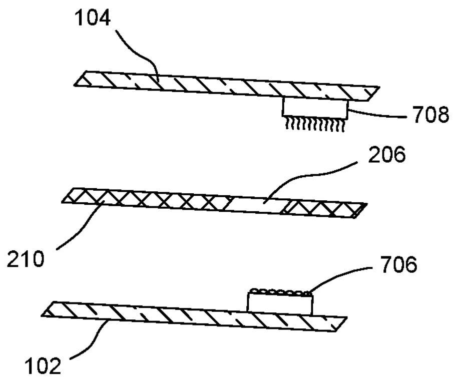
Figure 7C:
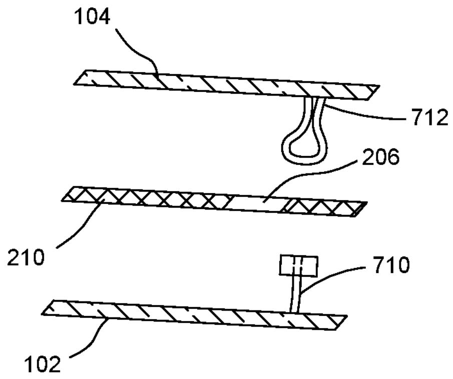

FIGS. 7A-7C show cross sectional view of the layers of a duvet cover and filler blanket system in which various connectors are used to how the layers together, in accordance with some embodiments. These are alternate connectors to the snap button type connectors directly fastened to the duvet cover panels as shown in previously described drawings. In FIG. 7A, a snap button connector system is used, but instead of the snap button elements being directly fastened to the duvet cover panels 102, 104, a short length of strap is coupled to the duvet cover panels, and connector elements 702, 704 are located on the ends of the strap elements. That is, connector element 702 is located on a strap element that extends from the bottom duvet cover panel 102, and mating connector element 704 is located on a similar strap element that is connected to the top duvet cover panel 104. These two mating connector elements can be connected to each other through an opening 206 in the filler blanket body. By using strap elements, the opening 206, rather than being a circular opening, can instead be a slit, such as, for example, a button opening on a garment. Using slits instead of circular openings can better conceal the openings when the filler blanket is used by itself, without the duvet cover.

In FIG. 7B, opposing hook and loop connector elements are used; a loop connector 706 can be disposed on the bottom duvet cover panel 102 and a hook connector element 708 can be disposed on the top duvet cover panel 104. The loop connector element 706 comprises an area of material that has a plurality of loops of a somewhat stiff material so that the loops extend away from the base of the connector element 706. The loops are engaged by "J" shaped hooks in the hook connector element 708. Hook and loop connectors are well known, and often referred to by the trade name VELCRO, which is a brand of hook and loop fastening systems. As is known, while these types of fasteners will hold together generally until a user pulls them apart. A benefit of using such connector elements over button snaps is that that when the duvet cover is laundered, there are not hard connector elements that can create a percussive noise when being tumbled in a dryer, for example. Further, a snap button will come completely apart if sufficient force is applied to the connector elements (away from each other), even if accidental. However, with a hook and loop fastener, some portion of the connector elements may peel apart but the connection will typically be renewed subsequently simply by motion of the duvet cover and filler blanket system. That is, a hook and loop type fastener can avoid the instantaneous and complete disconnection of connector elements, and even renew it full connection with the user even knowing.

In FIG. 7C, a bar and loop connector is shown. A bar 710 is coupled to the bottom duvet cover panel 102 by a string. the string is centrally attached to the bar 710, which extends roughly equidistant to either side of the attachment point of the string to the bar 710. The bar 710 can be cylindrical, or have other cross section shapes, but is generally an elongated rod or bar-shaped member. On the top duvet cover panel 104 there is a corresponding loop 712 that is made of a fairly robust string or cord. Both ends of the loop 712 are secured to the top duvet cover pane 104. The loop 712 has general diameter that allows the bar 710 to be inserted through the loop but which is smaller than the length of the bar 710. This allows the bar 710 to be inserted into, and past the loop 712, allowing the bar 710 to then be turned, which thereby retains the bar 710 against the loop 712. This arrangement of bar and loop has long been used in garments as a form of buttons on, for example, coats and other outerwear.

Figure 8:
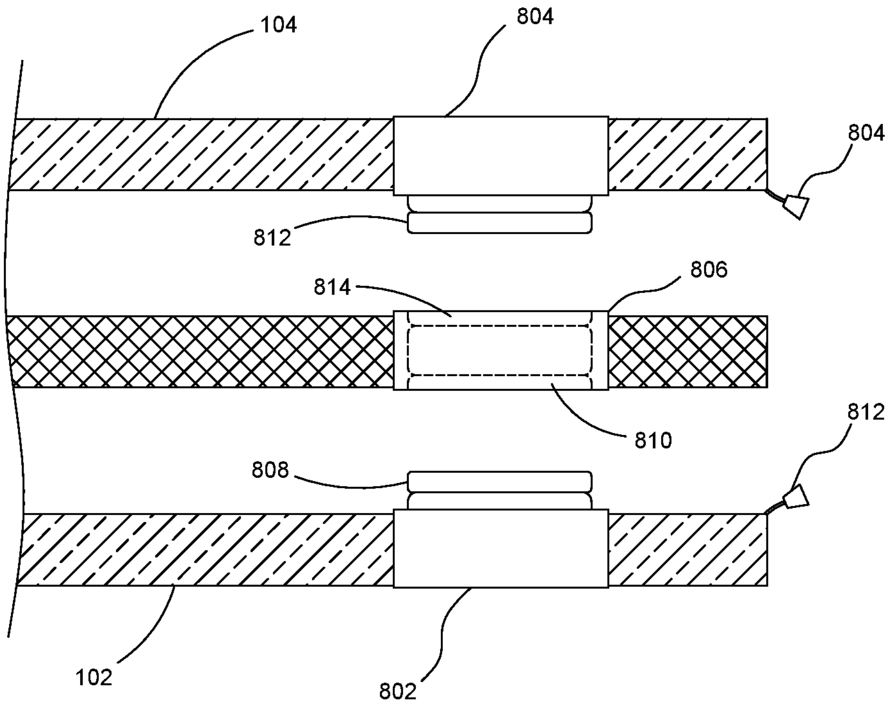
FIG. 8 a cross sectional view of the layers of a duvet cover and filler blanket system in which the filler blanket includes a connector, in accordance with some embodiments.

FIG. 8 a cross sectional view of the layers of a duvet cover and filler blanket system in which the filler blanket includes a connector, in accordance with some embodiments. In the embodiment of FIG. 8, rather than having a hole or other structure in the filler blanket for the connector elements of the duvet cover to pass through, it is contemplated that the filler blanket can also include structure and forms the connector system. In particular, as shown here, there is a double sided connector element 806 disposed in the filler blanket body 210. Bottom duvet cover panel 102 includes a connector element 802 and the top duvet cover panel 104 has a similar connector element 804. As shown there, the connector elements 802, 804, and 806 are snap button type connector elements which snap together. Connector element 802 includes a portion 808 that fits into a snap recess 810 of connector element 806, and connector element 804 has a portion 812 that fits into a snap recess 814 on the top of connector element 806. When connector elements 802, 804 are connected to connector element 806, the filler blanket body 210 will be retained by the bottom and top duvet cover panels 102, 104. Zipper elements 812, 814 can be used to zip the edges of the bottom and top panels 102, 104 together.

Figure 9:
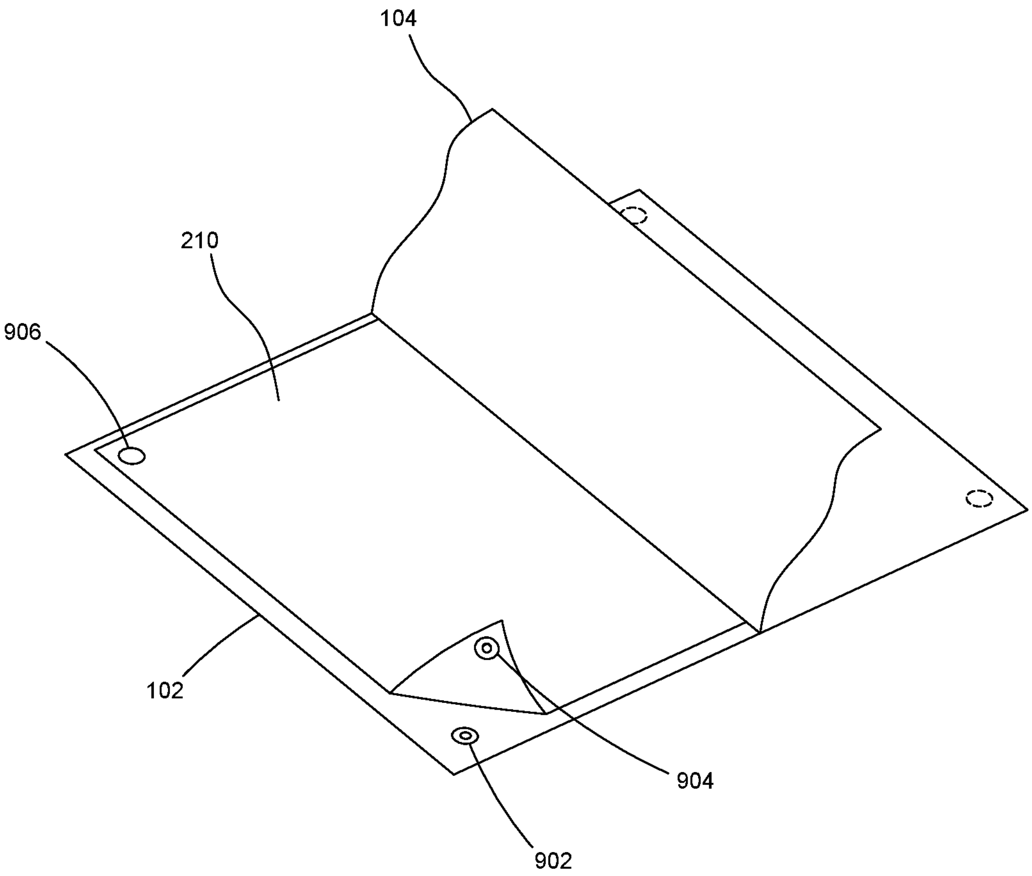
FIG. 9 shows a perspective view of a duvet cover and filler blanket system in which the filler blanket connects to one side of the duvet cover and the other side of the duvet cover lacks connecting elements, in accordance with some embodiments.

FIG. 9 shows a perspective view of a duvet cover and filler blanket system in which the filler blanket connects to one side of the duvet cover and the other side of the duvet cover lacks connecting elements, in accordance with some embodiments. It is further contemplated that the filler blanket 200 can be attached directly to one of the duvet cover panels, rather than having the duvet cover panels connect to each other. As shown here, the top duvet cover panel 104 lacks connector elements to pass through the filler blanket, although it still includes means to connect to the bottom duvet cover panel 102 along the edges of the duvet cover panels 102, 104, such as zipper elements. Instead, the blanket body 210 includes connector elements such as connector elements 904, 906 that connect to corresponding connector elements on the bottom duvet cover panel 102, such as connector element 902. In this arrangement the filler blanket is secured to the duvet cover, and will not bunch up or shift around inside the duvet cover, but the top duvet cover panel lacks any connector elements, which may be more aesthetically desirable for some people than having visible connector elements in the corners of the duvet cover.

A duvet cover and filler blanket system has been disclosed in which the filler blanket is held in place between the top and bottom duvet cover panels. This prevents the filler blanket from moving, shifting, or bunching up inside the duvet cover during use. The duvet cover includes connector elements at certain locations around the perimeter of the duvet cover, such as at the corners. These connector elements correspond to features of the filler blanket to retain the filler blanket in each location where the connector elements are located.

The claims appended hereto are meant to cover all modifications and changes within the scope and spirit of the present invention.

What is claimed is:

1. A bedding system, comprising:

a duvet cover having a top panel and a bottom panel that are substantially the same size and shape, and defining four corners;

the top panel and the bottom panel each having a first end edge and a second end edge opposite the first end edge, a first side edge and a second side edge opposite the first side edge, the top panel and bottom panel being integrally joined along the second end edge;

the first end edge, first side edge, and second side edge of the top panel and first end edge, first side edge, and second side edge of the bottom panel are, respectively, configured to be alternatively and selectively joined together and separated from each other;

a first connector disposed in a first corner of the duvet cover where the first end edge and first side edge meet, a second connector disposed in a second corner of the duvet cover where the first end edge and second side edge meet, a third connector disposed in a third corner of the duvet cover where the second end edge and first side edge meet, and a fourth connector disposed in a fourth corner of the duvet cover where the second end edge and second side edge meet, wherein the first, second, third, and fourth connectors comprise a strap portion attached to the top panel and a strap portion attached to the bottom panel, and wherein each of the strap portions comprise a snap button connector element;

wherein each of the first, second, third, and fourth connectors include a connector element disposed in the top panel and a corresponding mating connector element disposed in the bottom panel;

a filler blanket that is sized to fit between the top panel and the bottom panel of the duvet cover, the filler blanket having a first corner, a second corner, a third corner, and fourth corner, wherein at each of the first, second, third, and fourth corners of the filler blanket comprise an opening through which the first, second, third, and fourth connectors connect; and wherein the first connector, second connector, third connector, and fourth connector are each respectively configured to hold the first corner, second corner, third corner, and fourth corner of the filler blanket at the first corner, second corner, third corner, and fourth corner, respectively, of the duvet cover.

2. The bedding system of claim 1, wherein the first, second, third, and fourth connectors are snap button connectors.

3. The bedding system of claim 1, wherein the first, second, third, and fourth connectors are hook and loop connectors.

4. The bedding system of claim 1, wherein the first, second, third, and fourth connectors are bar and loop connectors.

5. A duvet cover and filler blanket system, comprising:

a duvet cover having a top panel and a bottom panel, wherein the top panel is configured to lay over the bottom panel thereby defining a first end edge, a second end edge opposite the first end edge, a first side edge, and a second side edge opposite the first side edge, wherein the top panel and bottom panel are integrally joined together along the second end edge, a first end edge zipper configured to selectively join and separate the top panel and the bottom panel along the first end edge, a first side edge zipper configured to selectively join and separate the top panel and the bottom panel along the first side edge, and a second side edge zipper configured to selectively join and separate the top panel and the bottom panel along the second side edge;

a filler blanket configured to fit between the top panel and the bottom panel; and a plurality of connectors that retain the filler blanket in place between the top and bottom panels, wherein the plurality of connectors each comprise a connector element at the top panel that mates with a corresponding connector element at the bottom panel through a corresponding loop of material attached to the filler blanket.

6. The system of claim 5, wherein the plurality of connectors are disposed at corners of the duvet cover and filler blanket.

7. The system claim 5, wherein the plurality of connectors each comprise interlocking snap connector elements.

8. The system of claim 5, wherein the plurality of connectors each comprise bar and loop connectors.

9. The system of claim 5, wherein the plurality of connectors each comprise hook and loop connectors.

10. A duvet cover and filler blanket system, comprising:

a duvet cover having a top panel and a bottom panel, wherein the top panel is configured to lay over the bottom panel thereby defining a first end edge, a second end edge opposite the first end edge, a first side edge, and a second side edge opposite the first side edge, wherein the top panel and bottom panel are integrally joined together along the second end edge, a first end edge zipper configured to selectively join and separate the top panel and the bottom panel along the first end edge, a first side edge zipper configured to selectively join and separate the top panel and the bottom panel along the first side edge, and a second side edge zipper configured to selectively join and separate the top panel and the bottom panel along the second side edge;

a filler blanket configured to fit between the top panel and the bottom panel; and a plurality of connectors that retain the filler blanket in place between the top and bottom panels, wherein the plurality of connectors comprise a double sided connector element in the filler blanket and corresponding snap connectors that mate with the double sided connector at the top panel and the bottom panel.

* * * * *